United States Patent [19] [11] 4,292,580
Ott et al. [45] Sep. 29, 1981

[54] CIRCUIT ARRANGEMENT FOR ATTENUATION OF POWER OSCILLATIONS IN NETWORKS

[75] Inventors: Günther Ott; Wolfgang Kaufhold, both of Erlangen, Fed. Rep. of Germany

[73] Assignee: Siemens Aktiengesellschaft, Munich, Fed. Rep. of Germany

[21] Appl. No.: 98,896

[22] Filed: Nov. 30, 1979

[30] Foreign Application Priority Data

Nov. 30, 1978 [DE] Fed. Rep. of Germany ....... 2851871

[51] Int. Cl.³ .............................................. G05F 5/00
[52] U.S. Cl. .................................... 323/212; 318/702; 307/102
[58] Field of Search ............... 323/101, 102, 104, 105, 323/108, 119, 121, 122; 333/32, 81 R; 318/702; 307/102, 262

[56] References Cited

U.S. PATENT DOCUMENTS 3,482,190 12/1969 Brenin ................................. 323/108
3,916,353 10/1975 Halberstein ....................... 333/81 R
3,968,422 7/1976 Waldmann .......................... 323/102
4,041,370 8/1977 Schroder ............................. 323/119

Primary Examiner—William M. Shoop
Assistant Examiner—Peter S. Wong
Attorney, Agent, or Firm—Kenyon & Kenyon

[57] ABSTRACT

A circuit arrangement, for deriving, from sensed power variations in a network, a signal for supplying the exciter of at least one synchronous machine coupled to the network, includes first and second vector identifiers, each providing a direct and phase-shifted output with each of the outputs coupled through an impedance matching amplifier to a summing junction. The direct signal from the first vector identifier and phase-shifted signal from the second vector identifier are conducted to one summing junction and the phase-shifted output of the first vector identifier and direct output of the second vector identifier to a second summing junction, with the outputs of the two summing junctions summed at a further summing junction after being coupled through additional impedance matching amplifiers to result in a total signal at the output of the third summing junction which varies in a mathematically positive sense with increasing oscillation frequency.

3 Claims, 1 Drawing Figure

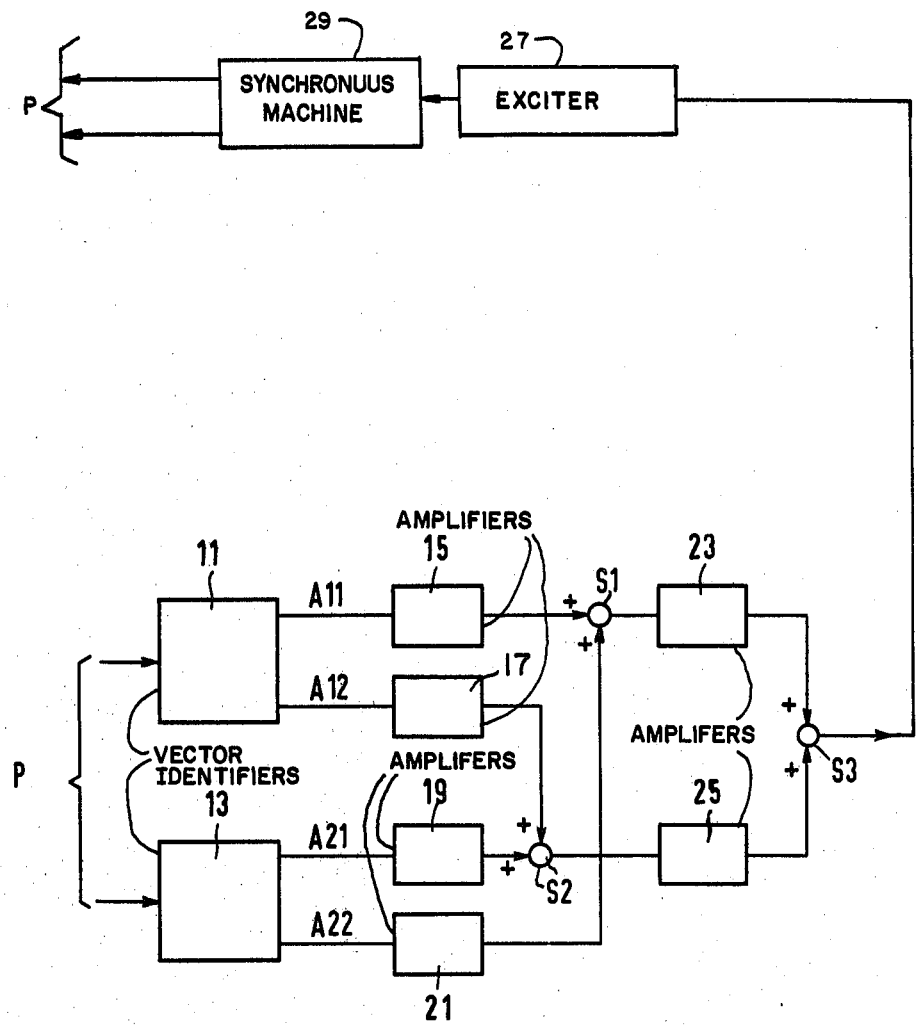

CIRCUIT ARRANGEMENT FOR ATTENUATION OF POWER OSCILLATIONS IN NETWORKS

BACKGROUND OF THE INVENTION

This invention relates to the attenuation of power oscillations in a network fed by a synchronous generator in general and more particularly to an improved circuit arrangement for bringing about such attenuation.

In order to attenuate power oscillations in networks by acting upon the exciter of a synchronous generator it has previously been customary to use circuits which are designed for a certain limited frequency range. These circuits, within their designed frequency range, form a damping signal which is derived from power changes in a network. The signal acts on the exciter of at least one synchronous machine which is connected to the network so as to influence the voltage regulator in a direction to eliminate the effects of power change. When filters are used, the damping signal has, within the selected range, an optimum phase position for only a single oscillation frequency. Where a range of oscillation frequencies are present, as is generally the case in operation of such devices, in order to obtain optimum phase positioning over the entire range, a plurality of differently rated filters thus becomes necessary. To use such a plurality of filters results in undue expense and can lead to undesired interactions.

SUMMARY OF THE INVENTION

It is the object of the present invention to provide a simple smoothly operating circuit arrangement which is capable of detecting power changes and attenuating them by supplying damping signals to the exciter of at least one synchronous machine, over an oscillating frequency range which includes all of the possible oscillation frequencies, in order establish optimum phase position over the full range.

The present invention solves this problem by providing two vector identifiers which are energized by the power changes in the network. One of the vector identifiers is designed for the minimum oscillating frequency and the other for the maximum oscillating frequency. The vector identifiers have direct outputs and outputs which are phase-shifted 90°. The direct and phase-shifted outputs of the vector identifiers are coupled through matching means in the form of operational amplifiers of different gains alternately to summing means whose outputs are then coupled through a further matching means to an additional summing means at the output of which a total signal can be picked up in a selected frequency range. The total signal varies in a mathematically positive sense with increasing oscillation frequency and influences the excitation.

BRIEF DESCRIPTION OF THE DRAWING

The single FIGURE is a block diagram of the circuit arrangement of the present invention.

DETAILED DESCRIPTION OF THE INVENTION

The actual active power, $P_{ist}$ of a generator [synchronous machine] 29 is monitored for its power variation. In other words, the power is measured and in conventional manner any oscillation existing on the measured power signal is detected. This power oscillation or variation is fed, in accordance with the present invention to two vector identifiers, 11 and 13 respectively.

A vector identifier, as more fully explained in connection with FIGS. 4a and 4b of U.S. Pat. No. 3,968,422, is a device which can be used to determine the amplitude and phases of an oscillation of known frequency. That is to say, it is designed to respond to a particular frequency. From a scaler input variable, it generates the two orthogonal components of the rotating vector. This is done through the use of amplifiers, summing means and a time delay so that the input is provided directly as one output, i.e., the unshifted output, and, through the circuit comprising the amplifier summing means and time delay, a second output shifted in phase 90° therefrom is provided. Thus, the two orthogonal components of the rotating vector result.

As a result, as shown on the FIGURE, vector identifier 11 has two outputs A11 and A12, its direct and phase-shifted outputs respectively. Similarly, vector identifier 13 has outputs A21 and A22, its direct and phase-shifted outputs respectively. One of the vector identifiers, for example, vector identifier 11 is designed for the maximum oscillation frequency, typically, for example, 1 to 1.2 Hz. The vector identifier 13 is designed for the minimum oscillation frequency, typically, for example, 0.2 to 0.4 Hz. The outputs A11 and A12 are fed, respectively, to operational amplifiers 15 and 17 which act as impedance matching means. Similarly, the outputs A21 and A22 are fed to amplifiers 19 and 21, also acting for impedance matching. The outputs of amplifiers 15 and 21 are fed to a first summing junction S1 and the outputs of the amplifiers 17 and 19 to a second summing junction S2. The summing junction S1 is located at the input of an operational amplifier 23, and the summing junction S2 at the input of an operational amplifier 25. The output of the amplifiers 23 and 25 are coupled to a further summing junction S3, at which a total signal which is used to act on the exciter arrangement 27 of a synchronous machine, 29 is picked up.

The operational amplifiers 15, 17, 19, 21, 23 and 25 establish the frequency dependence of the total signal over the total frequency range between the minimum and maximum oscillation frequency. The total signal consists of the sum of the component sums picked up at the two summing junctions S1 and S2. The phase position of the total signal changes over the range in a mathematically positive sense with increasing oscillation frequency. Outside the oscillation range, the phase position changes negatively with increasing frequency. This desired output signal is the result of the signals derived from the vector identifiers 11 and 13, along with the proper selection of the gains of the amplifiers 15, 17, 19 and 21 as well as operational amplifiers 23 and 25.

What is claimed is:

1. A circuit arrangement for supplying a signal to the exciter of at least one synchronous machine in order to attenuate power oscillations in a network to which the synchronous machine is coupled comprising:
    (a) first and second vector identifiers having as an input detected power oscillations in the system, each vector identifier providing a direct and a phase-shifted output, each designed for a different frequency;
    (b) first, second, third and fourth matching means receiving as inputs respectively, the direct output of said first vector identifier, the phase-shifted output of said first vector identifier, the direct output of said second vector identifier and the phase-shifted output of said second vector identifier;
(c) first and second summing junctions, said first summing junction having as inputs the output of said first and fourth matching means and the second summing junction having as inputs the outputs of said second and third matching means;
(d) fifth and sixth matching means having as inputs respectively, the outputs of said first and second summing junctions; and
(e) third summing junction having as inputs the outputs of said fifth and sixth matching means and providing at its output a total signal which, over a selectable frequency range, varies in a mathematically positive sense with increasing oscillation frequency whereby said signal can be supplied to the exciter of a synchronous machine in order to damp power oscillations in the network.

2. The circuit arrangement of claim 1 wherein one of said vector identifiers is designed for the minimum oscillation frequency and the other for the maximum oscillation frequency.

3. A circuit arrangement according to claim 1 or 2 wherein each of said matching means comprise an operational amplifier.

* * * * *